United States Patent [19]
Miller

[11] Patent Number: 6,119,120
[45] Date of Patent: Sep. 12, 2000

[54] COMPUTER IMPLEMENTED METHODS FOR CONSTRUCTING A COMPRESSED DATA STRUCTURE FROM A DATA STRING AND FOR USING THE DATA STRUCTURE TO FIND DATA PATTERNS IN THE DATA STRING

[75] Inventor: John W. Miller, Kirkland, Wash.

[73] Assignee: Microsoft Corporation, Redmond, Wash.

[21] Appl. No.: 08/673,427

[22] Filed: Jun. 28, 1996

[51] Int. Cl.[7] ........................................................ G06F 17/30
[52] U.S. Cl. ................................... 707/101; 707/6; 707/7; 707/3
[58] Field of Search .................................... 382/229, 230, 382/231; 707/6, 3, 7, 101, 2

[56] References Cited

U.S. PATENT DOCUMENTS 5,459,739  10/1995  Handley et al. ......................... 371/136

OTHER PUBLICATIONS

"Dynamic Programming Alignment of Sequences Representing Cyclic Patterns", by Jens Gregor and Michael G. Thomason, IEEE Transactions on Pattern Analysis and Machine Intelligence, vol. 15, No. 2, pp. 129–135, Feb. 1993.

"Searching Genetic Databases on Splash 2", by Dzung T. Hoang, Proceedings IEEE Workshop on FPGAs for Custom Computing Machines (Cat. No. 93TH0535–5), pp. 185–191, Apr. 5, 1993.

"Rapid–2, An Objecti–Oriented Association Memory Applicable to Genome Data Processing", by Denis Archambaud, Pascal Faudemay, and Alain Greiner Proceedings of the Twenty–Seventh Annual Hawaii International Conference on System Sciences, pp. 150–159, Jan. 1994.

"A Faster Algorithm Computing String Edit Distances", William J. Masek and Michael S. Paterson, Journal of Computer and System Sciences, 20, pp. 18–31, Aug. 6, 1979.

"Synthesis and Recognition of Sequences", by S.C. Chan and A.K.C. Wong, IEEE Transactions on Pattern Analysis and Machine Intelligence, vol. 13, No. 12, pp. 1245–1255, Dec. 1991.

"Efficient Systolic String Matching", by G.M. Megson, Electronic Letters, vol. 26, No. 24, pp. 2040–2042, Nov. 1990.

Primary Examiner—Amelia Au
Assistant Examiner—Gilberto Frederick, II
Attorney, Agent, or Firm—Lee & Hayes, PLLC

[57] ABSTRACT

A method for constructing a data structure for a data string of characters includes producing a matrix of sorted rotations of the data string. This matrix defines an A array which is a sorted list of the characters in the data string, a B array which is a permutation of the data string, and a correspondence array C which contains correspondence entries linking the characters in the A array to the same characters in the B array. A reduced A' array is computed to identify each unique character in the A array and a reduced C' array is computed to contain every $s^{th}$ entry of the C array. The B array is segmented into blocks of size s. During a search, the A' and C' arrays are used to index the B array to reconstruct any desired row from the matrix of rotations. Through this representation, the matrix of rotations can thus be used as a conventional sorted list for pattern matching or information retrieval applications. A data structure containing only the A', B, and C' has very little memory overhead. The B array contains the same number of characters as the original data string, and can be compressed in a block wise manner to reduce its size. The A' array is a fixed size equal to the size of the alphabet used to construct the data string, and the C' array is variable size according to the relationship n/s, where n is the number of characters in the data string and s is the size of the blocks of the B array. Accordingly, the data structure enables a tradeoff between access speed and memory overhead, the product of which is constant with respect to block size s.

35 Claims, 5 Drawing Sheets

*Prior Art*

*Prior Art*

Fig. 5

Matrix M (B):

|   | 1 | 2 | 3 | 4 | 5 | 6 | 7 | 8 | 9 | 10 |
|---|---|---|---|---|---|---|---|---|---|---|
| 1 | e | s | t | _ | t | e | x | t | # | t |
| 2 | e | x | t | # | t | e | s | t | _ | t |
| 3 | s | t | _ | t | e | x | t | # | t | e |
| 4 | t | e | s | t | _ | t | e | x | t | # |
| 5 | t | e | x | t | # | t | e | s | t | _ |
| 6 | t | _ | t | e | x | t | # | t | e | s |
| 7 | t | # | t | e | s | t | _ | t | e | x |
| 8 | x | t | # | t | e | s | t | _ | t | e |
| 9 | _ | t | e | x | t | # | t | e | s | t |
| 10 | # | t | e | s | t | _ | t | e | x | t |

Matrix M (A):

|   | 1 | 2 | 3 | 4 | 5 | 6 | 7 | 8 | 9 | 10 |
|---|---|---|---|---|---|---|---|---|---|---|
| 1 | e | s | t | _ | t | e | x | t | # | t |
| 2 | e | x | t | # | t | e | s | t | _ | t |
| 3 | s | t | _ | t | e | x | t | # | t | e |
| 4 | t | e | s | t | _ | t | e | x | t | # |
| 5 | t | e | x | t | # | t | e | s | t | _ |
| 6 | t | _ | t | e | x | t | # | t | e | s |
| 7 | t | # | t | e | s | t | _ | t | e | x |
| 8 | x | t | # | t | e | s | t | _ | t | e |
| 9 | _ | t | e | x | t | # | t | e | s | t |
| 10 | # | t | e | s | t | _ | t | e | x | t |

Fig. 6

Matrix M (B, C):

| 0 | 0 | 1 | 0 | 1 | 1 | 1 | 0 | 1 | 0 |
| 0 | 1 | 0 | 0 | 1 | 0 | 1 | 1 | 1 | 0 |
| 0 | 1 | 0 | 1 | 1 | 1 | 0 | 1 | 0 | 0 |
| 0 | 1 | 1 | 1 | 0 | 1 | 0 | 0 | 1 | 0 |
| 1 | 0 | 0 | 1 | 0 | 1 | 1 | 1 | 0 | 1 |
| 1 | 0 | 1 | 0 | 0 | 1 | 0 | 1 | 1 | 1 |
| 1 | 0 | 1 | 1 | 1 | 0 | 1 | 0 | 0 | 1 |
| 1 | 1 | 0 | 1 | 0 | 0 | 1 | 0 | 1 | 1 |
| 1 | 1 | 1 | 0 | 1 | 0 | 0 | 1 | 0 | 1 |

Matrix M (A):

| 0 | 1 | 0 | 1 | 1 | 1 | 0 | 1 |
| 1 | 0 | 0 | 1 | 0 | 1 | 1 | 1 |
| 1 | 0 | 1 | 1 | 1 | 0 | 1 | 0 |
| 1 | 1 | 1 | 0 | 1 | 0 | 0 | 1 |
| 0 | 0 | 1 | 0 | 1 | 1 | 1 | 0 |
| 0 | 1 | 0 | 0 | 1 | 0 | 1 | 1 |
| 0 | 1 | 1 | 1 | 0 | 1 | 0 | 0 |
| 1 | 0 | 1 | 0 | 0 | 1 | 0 | 1 |
| 1 | 1 | 0 | 1 | 0 | 0 | 1 | 0 |

COMPUTER IMPLEMENTED METHODS FOR CONSTRUCTING A COMPRESSED DATA STRUCTURE FROM A DATA STRING AND FOR USING THE DATA STRUCTURE TO FIND DATA PATTERNS IN THE DATA STRING

TECHNICAL FIELD

This invention relates to methods for indexing sequences of data, such as textual materials or DNA. More particularly, this invention relates to methods for constructing a highly compressed data structure which enables efficient searches for particular patterns in the data, without having to examine the entire structure.

BACKGROUND OF THE INVENTION SECTION

An index is a list of key elements and associated information that points to a location containing more comprehensive data. A book index, for example, contains word entries and associated page numbers pointing to the detailed information in the book. In the electronic realm, indexes are used to locate particular files of data entries in a data storage system. The amount of indexing memory above and beyond that required to store the original text or data will be referred to as "memory overhead." The amount of time required to find a particular sequence in the data or text will be referred to as the "time overhead."

Various techniques exist to reduce the memory overhead. An obvious approach is to store no index at all. The text is simply scanned serially for any pattern desired. This technique and related methods require access time which grows linearly with the size of the text. As the text size doubles, the typical time required to find a pattern likewise grows twofold. Indexing schemes, such as a conventional book index provide much faster access but with memory overhead which grows linearly or faster with the size of the text. If the size of the text doubles then the index likewise grows twofold.

Accordingly, there is a need for an indexing scheme which provides both smaller than linear time overhead and smaller than linear memory overhead.

One well known and useful data structure is a sorted list of all data records. This kind of data structure has applications ranging from data storage systems to pattern matching algorithms. For unstructured text, this can correspond to representing a sorted list of all suffixes of the text stream or all rotations of the text. A "rotation" of a sequence of characters is a new sequence created by repeatedly taking the first character and placing it at the end of the previous sequence.

For example, consider the ten character sequence "test_text#." Rotating the original sequence all possible times yields the following ten rotations:

Possible Rotations test_text#
est_text#t
st_text#te
t_text#tes
_text#test
text#test_
ext#test_t
xt#test_te
t#test_tex
test_text Alphabetically sorting these ten rotations of the ten character sequence produces the following organization of the data:

Alphabetically Sorted Rotations est_text#t
ext#test_t
st_text#te
test_text#
text#test_
t_text#tes
t#test_tex
xt#test_te
_text#test
test_text The data structure formed from this sorted list of rotations can be used to quickly answer questions, such as "How many times did a three character string tex occur?," and "If that pattern did occur, what characters followed and preceded it?" One prior art technique for storing a representation for all the rotations of the text is to store a list of pointers to the original text such that the ordered pointers refer to the first character of each rotation of the text in sorted order.

In general, there exists a tradeoff between memory capacity requirements and access performance. It is desirable to minimize the amount of memory required to represent the list of sorted rotations given a limited amount of time allowed to read characters from the representation.

One prior art scheme that uses a list of sorted rotations is known as the "Burrows-Wheeler Compression Algorithm." The Burrows-Wheeler (BW) Compression Algorithm is described in an article entitled, "A Block-sorting Lossless Data Compression Algorithm" by M. Burrows and D. J. Wheeler, Digital Systems Research Center Research Report 124, May 10, 1994. The BW Compression Algorithm is based upon the following insight: for an alphabetically sorted list of all possible rotations of a block of text, the sequence of last characters for each alphabetized rotation fully describes a rotation of the original text.

FIG. 1 shows two identical copies of the ten rotations of the sequence "test_text#" identified by rows and columns in a matrix. The rows are sorted alphabetically. According to the finding from the Burrows-Wheeler article, the last column of the matrix (column 10) fully defines a rotation of the original text of characters. The entire matrix can be recreated from the tenth column. To show why this is true, notice that all rows and columns of the 10-by-10 matrix are permutations of the original text sequence. Since the rows are alphabetized, column 1 must be alphabetized and can be created simply by alphabetizing column 10. Each character in column 10 can be interpreted as the character which cyclically precedes the character in the same row of column 1. In this example, the two letters "t" in column 10 (rows 1 and 2) precede the letters "e" in column 1 (rows 1 and 2). Similarly, the single letter "e" in column 10 (row 3) precedes the letter "s" in column 1 (row 3).

The original text "test_text#" can be recovered if there exists a correspondence indicating not just that the letter "s" is preceded by a letter "e," but that a particular "s" is preceded by a particular "e." In FIG. 1, four lines are drawn to show a correspondence between identical letters "t" in columns 1 and 10. For example, the line from column 1, row 4 to column 10, row 1 indicates the particular letter "t" that is preceded by the symbol "#" (i.e., the first "t" in column 1) is also the same letter "t" which precedes the letter "e" (i.e., the first "t" in column 10). As a result, the three letter string "#te" is definitely a substring of one of the rotations of the original text.

The entire matrix of sorted rotations can be created if the correct lines of correspondence can be determined. This exercise turns out to be simple. When all rotations of text are unique, there is only one correspondence between the characters in columns 1 and 10 which is self-consistent. This unique correspondence can be described by the visual property that all the lines of correspondence for a particular letter cannot cross each other when replicated matrixes are arranged side-by-side as in FIG. 1. For example, the four lines connecting the letters "t" connect column 10, rows 1, 2, 9, and 10 to column 1, rows 4, 5, 6, and 7, respectively, without any of these four lines intersecting. These lines cannot intersect because given a set of alphabetized word sequences (e.g., rows 1, 2, 9, 10) which are prepended each with the same character (e.g., "t"), the new sequences created (effectively rows 4, 5, 6, 7) will be in alphabetical order. From the non-intersecting rule, it is clear that there is only one consistent set of correspondences when all rotations are unique.

FIG. 2 shows the same side-by-side matrix configuration with all ten correspondence lines. Beginning with the sample substring of "#te," these lines can be followed until a complete rotation #test_text" is decoded. Burrows and Wheeler also noted that the last column is, in some sense, more easily compressed than the original text. The BW Compression Algorithm thus provides a useful tool for the compression and decompression of textual material by computing the matrix of sorted rotations and compressing the last column.

The BW Compression Algorithm is limited, however, to a compression/decompression process. It is not very useful as a pattern search tool. To directly access a specific pattern using the BW algorithm, the text essentially must be decompressed and then scanned directly until the pattern is found. The time required to do this grows proportionally to the size of the compressed text.

SUMMARY OF THE INVENTION

The invention concerns a technique which employs a matrix of rotations, such as the sorted list of rotations created by the BW Compression Algorithm, for use in finding patterns that occur in data. This invention offers a tradeoff between access speed and storage efficiency. An increase in access speed comes at a proportional cost of additional storage space demands. As a result, a designer is allowed the flexibility to configure the data structure according to a desired set of performance and storage requirements.

According to one aspect, a method for constructing a data structure for a data string of characters is described. The method includes producing a matrix of sorted rotations of the data string. This matrix defines an A array which is a sorted list of the characters in the data string and a B array which is a permutation of the data string. A correspondence array C is then computed to contain correspondence entries linking the characters in the A array to the same characters in the B array. A reduced A' array is computed to identify each unique character in the A array and a reduced C' array is computed to contain every $s^{th}$ entry of the C array. The A' and C' arrays are used to find particular characters within the blocks of the B array to thereby reconstruct patterns of characters within the original data string.

A data structure containing only the A', B, and C' arrays can be used to recreate any term from the full A,B, or C arrays. The full A and C arrays can be used, using Burrows and Wheelers result, to recreate the original text or more generally any row of the matrix of sorted rotations. The sorted rows of text can then be used as a conventional sorted index to find desired patterns in the text. The A', B and C' data structures represent the original text and the index with very little memory overhead. The B array contains the same number of characters as the original text. The A' array is a fixed size equal to the size of the alphabet used to construct the data string. The C' array is of size n/s, where n is the number of characters in the data string and s is the chosen size of the blocks of the B array.

Because the A' array is fixed-size and the C' array scales according to 1/s, the data structure enables a tradeoff (which varies with block size s) between access speed and memory overhead. If a designer is more concerned with access speed, the designer uses a small block size s, which improves performance because the indexing array C' is larger and contains more information to help facilitate a more rapid search. This improved performance comes at a direct cost of additional storage requirements to store the large C' array. On the other hand, if the designer is more interested in conserving storage space, the designer uses a larger block size S. The C' array is smaller, thereby requiring less storage space, but at a cost of slower access time.

According to another aspect, the data structure is compressed in a block wise manner. The blocks of the B array are compressed individually using a combination of move-to-front encoding, run-length encoding, and a variable length coding (e.g., Huffman coding) algorithm. This enables the data structure to be stored in less memory, while still permitting decompression of individual blocks for access to characters without having to decompress the entire data structure.

According to another aspect, the data structure is enhanced to include additional block indexing information that can be used to facilitate searching at the macro block level, as opposed to the micro character level, to improve search efficiency. This enhanced data structure contains type information for each block that identifies which types of characters and how many characters of particular types are contained within the associated block. The type information permits a search of the data structure to examine at the block level whether a particular block contains a target character. The enhanced data structure further includes character jump information for each block that references where a next character of a particular type occurs in the blocks. The jump information permits a search of the data structure to skip over large numbers of blocks that do not contain the target character. The type and jump information can be stored as separate arrays, or as headers for the blocks of the B array.

BRIEF DESCRIPTION OF THE DRAWINGS

FIG. 1 illustrates a conventional matrix of sorted rotations.

FIG. 2 illustrates lines of correspondence interconnecting two identical matrices of sorted rotations, according to a prior art technique.

FIG. 5 is a reproduction of the matrix of sorted rotations shown in FIG. 2, and includes additional labels to facilitate discussion of construction of the A, B, and C arrays of a list of sorted rotations.

FIG. 6 illustrates a matrix of sorted rotations for a binary alphabet and is used for discussion of an aspect of this invention concerning derivation of a C' array from the C array.

DETAILED DESCRIPTION OF THE PREFERRED EMBODIMENT

This invention pertains to techniques for finding sequences or patterns of data within a larger body of data. For purposes of continuing discussion, the techniques are described below within the context of a search and retrieval tool configured for detecting strings of characters stored in memory. However, the techniques may be applied to other pattern matching problems. For instance, another possible application is to use the techniques described herein for DNA matching in molecular biology.

Figure 3:
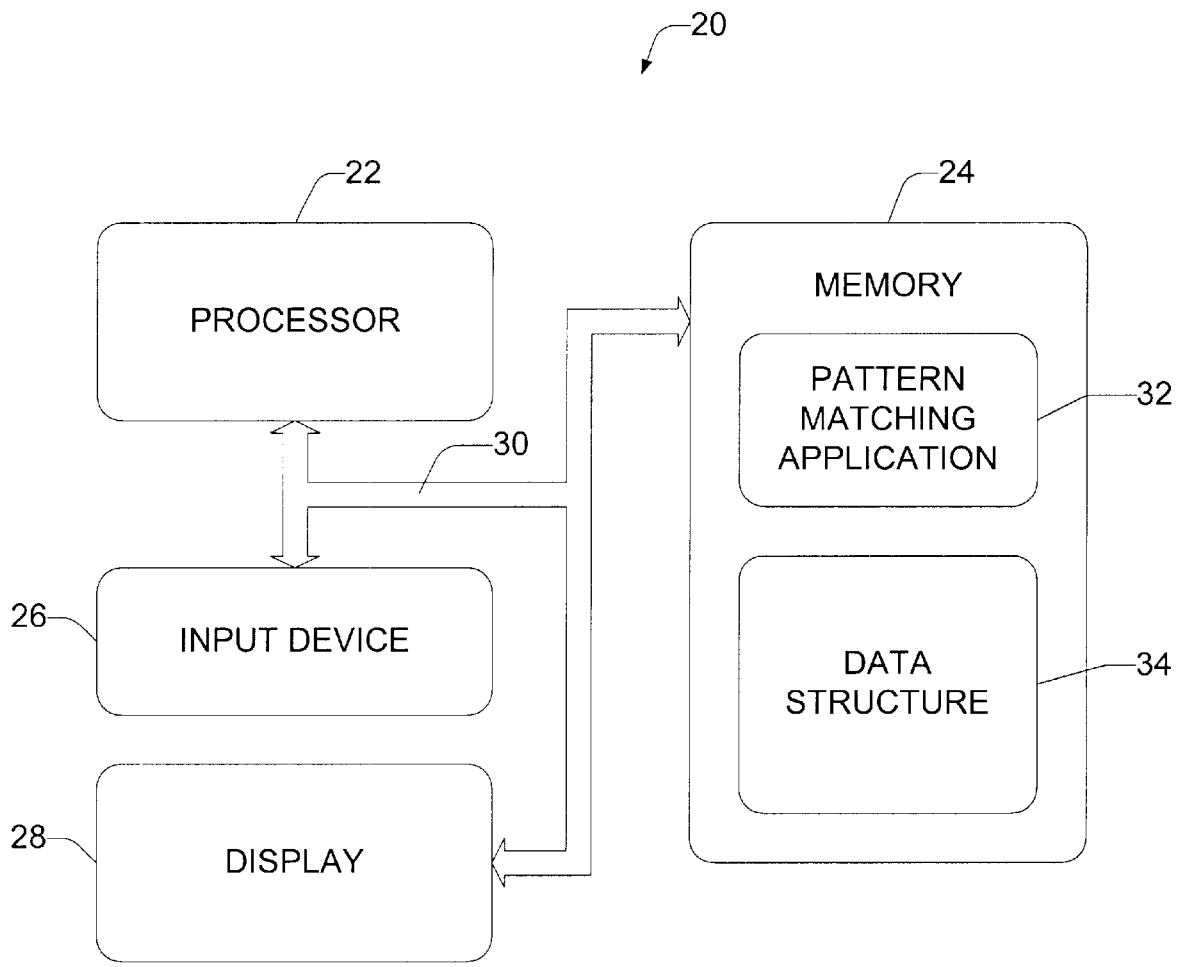
FIG. 3 is a block diagram of a computer programmed to perform methods according to aspects of this invention.

FIG. 3 shows a computer system 20 having a processor 22, a memory 24, an input device 26 (e.g., keyboard, mouse, etc.), and a display 28. These components are interconnected via a bus 30. A pattern matching application 32 is stored in memory 24 and executed on the processor 22. The pattern matching application 32 performs a series of operations on a large body of data to create a data structure 34 that can be used to index or find specific patterns within the data, regardless of where they occur or whether they occur across boundaries separating one data item from the next.

The resultant data structure 34 includes a representation of the entire body of data as well as a highly compressed index to the data. When ready for use, the data structure 34 (data and index) is loaded in its entirety into a data memory (e.g., RAM) for convenient access by the processor 22. The pattern matching application 32 is then able to perform searches for particular character sequences in the data by using the data structure.

Figure 4:
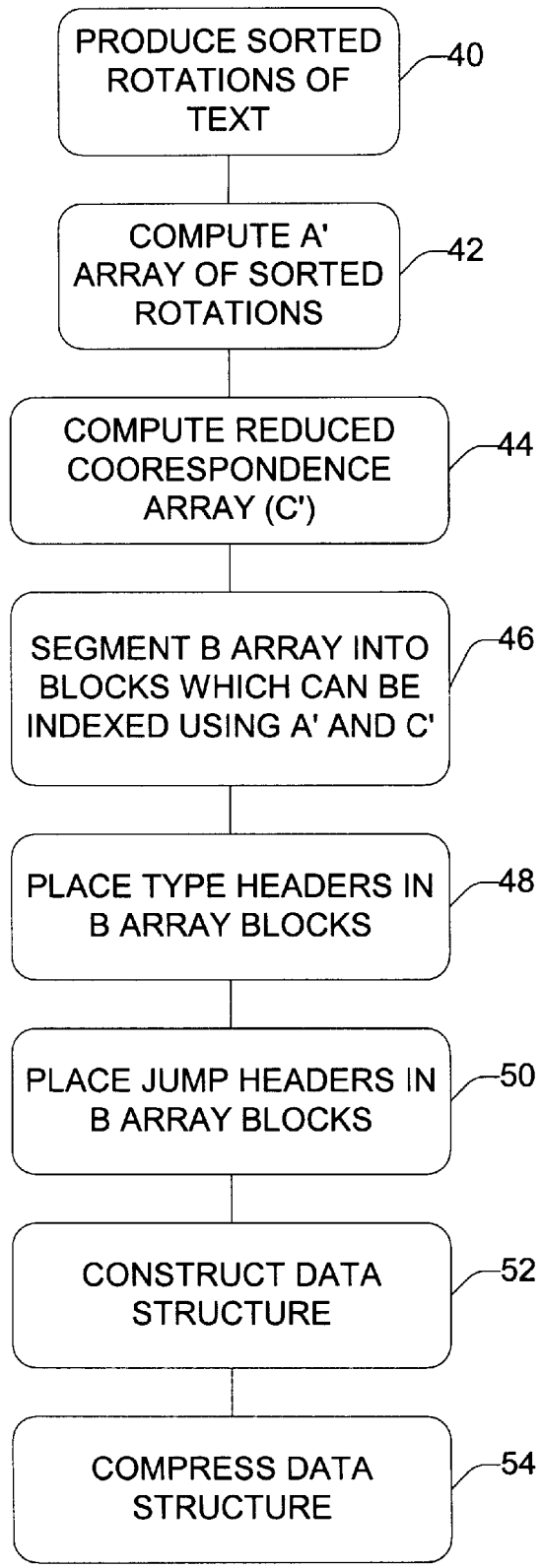
FIG. 4 is a flow diagram listing steps in a method for creating a data structure used to find small data patterns within a large body of data.

FIG. 4 shows a computer-implemented method performed by the computer during execution of the pattern matching application 32 to create the data structure 34. This method will be described with reference to FIGS. 3 and 5–8.

Produce Sorted Rotations (Step 40)

The initial step 40 is to produce sorted rotations of a data string of characters. As used herein, the term character is meant to be an item or term of the data string. The term character is not to be limited to any particular type or kind of notation. Examples of possible characters include numbers, letters, punctuation, symbols, DNA amino acids, and the like.

Step 40 can be performed a number of ways. One way is to first produce all of the rotations from the data string, and then sort the rotations using an iterative comparison operation. During a first pass, the comparison operation examines only the first character (i.e., letter, punctuation, number, etc.) of each rotation to perform an initial sort. Each group of rotations which begin with the same character is then sorted using a comparison operation which examines only the second character of the rotation. This is repeated recursively until the entire sequence is sorted (i.e., alphabetically, numerically ordered, etc.).

Other algorithms can be used to establish a sorted list of rotations, including the Burrows-Wheeler (BW) Compression Algorithm discussed in the Background of the Invention Section and an algorithm described by E. McCreight, "A Space-Economical Suffix Tree Construction Algorithm," Journal of the ACM, Vol. 23, #2, 1976, pp. 262.

Figures 1, 2:
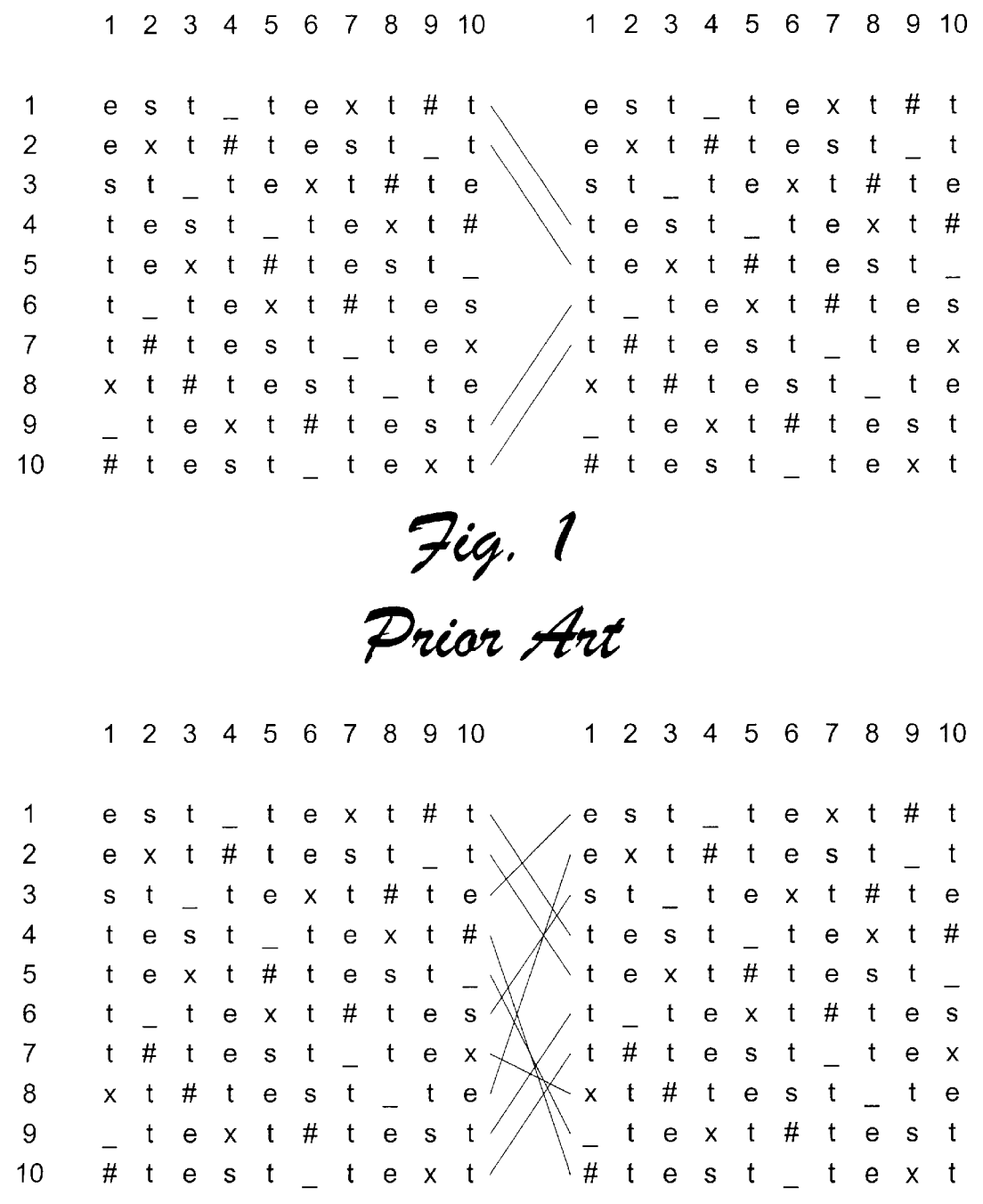

For purposes of continuing discussion, suppose that the data string consists of the text "test_text#" which was introduced in the Background of the Invention section. All rotations of this data string are computed and then sorted alphabetically. FIG. 5 shows the matrix of sorted rotations, which is essentially a reproduction of FIG. 2. One idea suggested by Burrows-Wheeler article is that the entire matrix of rotations can be recovered from the first and last columns (i.e., columns 1 and 10) and the lines of correspondence.

To briefly describe how this occurs, it is helpful to first calculate an array which represents the lines of correspondence shown in FIG. 5. To do this, it is useful to define a few terms. Let M be the matrix of sorted rotations, A be an array containing the characters in the first column (i.e., the alphabetized sequence of the matrix M), and B be an array containing the characters in the last column of the matrix M. Also, let C be a correspondence array showing the correspondence of the characters in A to the same characters in B, so that, $$B[C[i]]=A[i]$$

In other words, the correspondence array C contains the row numbers for characters in array B which correlate through the lines of correspondence to the same letters in array A. The first letter "e" in array A is the same letter "e" in row 3 of array B, and hence, the first entry in the correspondence array C is the number 3. Completing the arrays for the example of FIG. 5 yields the following:

$$A=[e,e,s,t,t,t,t,x,\_,\#]$$

$$B=[t,t,e,\#,\_,s,x,e,t,t]$$

$$C=[3,8,6,1,2,9,10,7,5,4]$$

Now, let M[i][j] indicate the character in the $i^{th}$ row and $j^{th}$ column of matrix M. Similarly, the notation A[i], B[i], C[i], and so forth is used to indicate the $i^{th}$ value in the respective array. Now, any row "i" of M can be calculated from A, B, and C by the following recursive definition:

$$M[i][j]=A[P_i[j]];$$

where $P_i[1]=i$ and $P_i[j]=C[P_i[j-1]]$ for $j>1$

For i=1 (i.e., the first row), the entire first row rotation can be reconstructed. Table 1 shows the reconstruction of the first three characters "est" of the first rotation (i.e., row 1).

TABLE 1

| P Computation for each j | M Computation, Given P |
|---|---|
| $P_1[1] = 1$ (defined) | $M[1][1] = A[P_1[1]] = A[1] = e$ |
| j = 2; $P_1[2] = C[P_1[1]] = C[1] = 3$ | $M[1][2] = A[P_1[2]] = A[3] = s$ |
| j = 3; $P_1[3] = C[P_1[2]] = C[C[1]] = 6$ | $M[1][3] = A[P_1[3]] = A[6] = t$ |

Accordingly, from this set of rotations, the matrix M can be recovered from the A, B, and C arrays. For a text having n characters, a memory of size 2n characters is needed to store the A and B arrays plus n pointers (requiring $\log_2(n)$ bits) to store the C array.

The remaining steps of the method illustrated in FIG. 4 describe construction of a data structure which consumes less space as compared to the memory required to store a full list of sorted rotations or the full A, B, and C arrays, while still permitting complete recovery of the rotations. Additionally, the data structure can be compressed, yet still allow direct access to substrings of the data string without decompressing the entire text.

Compute Reduced Sorted Array A' (Step 42)

At step 42 in FIG. 4, the pattern matching application 32 in FIG. 3 directs the computer to create a reduced sorted array A', which contains information for each unique character in the alphabetically sorted array A. The reduced array A' contains the row numbers or locations which are the start of each unique character in the array A. As shown in FIG. 5, the first occurrence of letter "e" in array A is at row 1. Array A' reflects this with an entry of position 1. Likewise, the first occurrences of letters "s" and "t" in array A are at rows 3 and 4, respectively, resulting in an entry of positions 3 and 4 in array A'. Continuing through the entire A array produces an array A' as follows:

$$A'=[1,3,4,8,9,10].$$

The array A' is defined mathematically as follows. For each character c which occurs in array A, the reduced array A' is defined such that:

$$A[A'[c]]=c \text{ and } A[j] \neq c \text{ for all } j<A'[c]$$

For the first occurrence of character "e" in array A of FIG. 5, the relationship yields a corresponding result for array A' of A'[e]=1, because A[A'[e]]=A[1]=e. For all unique characters in array A, the relationship yields:

$$A'[e]=1, A'[s]=3, A'[t]=4, A'[x]=8, A'[\_]=9, A'[\#]=10 \text{ or } A'=[1,3,4,8,9,10].$$

Another way to derive array A' is to first count each type of character in the original data string. Since the A array contains sorted characters (i.e., alphabetized letters, numerically ordered numbers, etc.), the counts represent how many characters of one type are listed before moving to the next ordered character. These counts thereby provide spacing between the values loaded into the A' array.

The size of array A' is bound by the size of the alphabet used in constructing the text. This is advantageous because the array A' is independent of the number of characters (i.e., n) in the original text sequence. In the example text "test_text#," the alphabet size consists of six characters: e, s, t, x, _, and #. The array A' has six entries corresponding to the six characters, which is reduced from the ten characters that make up the full A array. As other examples, a fall alphabet consists of 26 characters, A–Z, and a binary alphabet has two characters, 0 and 1.

The full array A, which varies in size according to the size of the text, can be entirely recovered from the fixed-size array A' (i.e., fixed to the size of the alphabet). The alphabet is known and provides an ordered sequence of characters. The A' array provides the information to expand the characters to the full array. For instance, using the ordered six character alphabet e, s, t, x, _, #, the array A' indicates that the letter "e" appears in the first position, the letter "s" appears in the third position, and so on. The positions not designated by array A' are then filled with the same letter cited above it. The second position of array A, which is not designated in the array A', is filled with the letter "e" because it follows the letter "e" in the first position and we know the letter "s" does not begin until the third position. In this manner, the fall array A is recoverable entirely from the reduced array A'.

For a given fixed alphabet size, the time required to calculate an entry in the full array A from the reduced array A' is bound to a constant. The recalculation time is independent of the number of characters in the text. As a result, as the number of characters increases, the time cost for recovering an entry from the array A becomes an increasingly smaller percentage of the entire processing cost. This is advantageous as text sizes increase.

The original text and all rows in the rotation matrix M can be entirely calculated from the correspondence array C and the fixed-size array A'. That is, the array A' is used to recover the array A; the arrays A and C are used to recover the array B (which is a permutation of the entire text); and the arrays A, B, and C are used to recover the matrix M.

Compute Reduced Correspondence Array C' (Step 44)

At step 44 in FIG. 4, the pattern matching application directs the computer to sample the correspondence array C to form a reduced array C'. For a particular parameter s, which defines the block size and hence represents a speed factor for access time, the array C' is created by taking every $s^{th}$ term of the correspondence array C:

$$C'[i]=C[1+(i-1)*s]$$

The size of the reduced array C' is the number of characters n in the text divided by block size s (i.e., n/s).

FIG. 6 shows an example derivation of a compressed correspondence array C' from a nine-by-nine matrix M of sorted rotations of a binary string. The binary string is constructed from a two character alphabet: 0 and 1. The alphabetized array A representing the first column, the array B representing the last column, and the correspondence array C derived from the lines of correspondence are as follows:

$$A=[0,0,0,0,1,1,1,1,1]$$

$$B=[1,1,0,1,0,1,0,1,0]$$

$$C=[3,5,7,9,1,2,4,6,8]$$

For this example, suppose the block size s is set to two. For s=2, a reduced array C' is formed of the row numbers in array B which correlate to every other term (i.e., s=2) in array A, as indicated by the solid lines. This reduction produces an array C' as follows:

$$C'=[3,7,1,4,8]$$

Segment B Array Into Blocks (Step 46)

Figure 7:
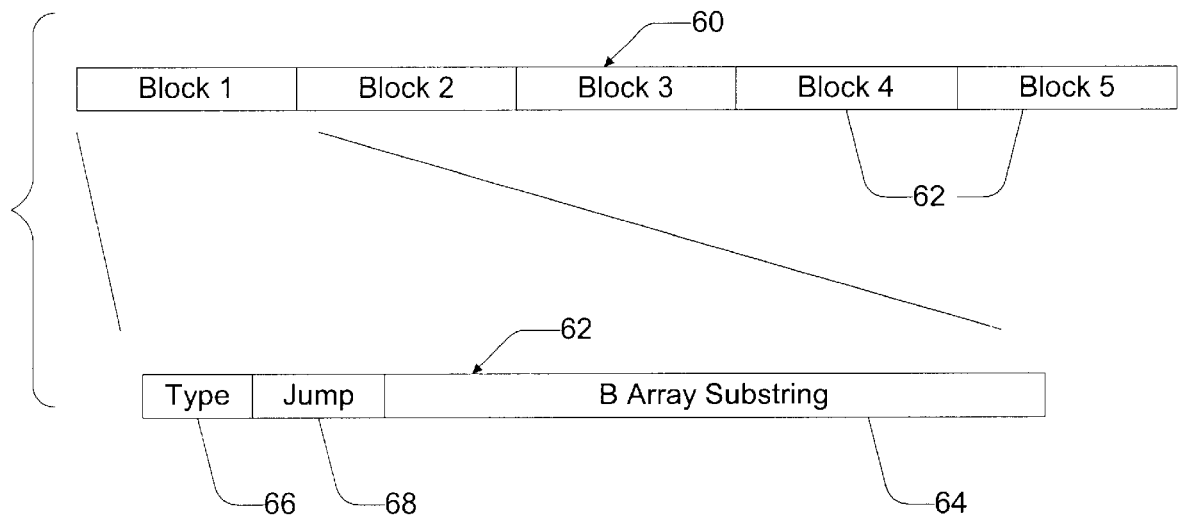
FIG. 7 shows a data structure according to a first implementation of this invention.

At step 46 in FIG. 4, the B array is segmented into blocks containing substrings of s characters. FIG. 7 shows a sequence 60 of five blocks 62. Each block 62 contains a substring portion 64 which consists of the s characters associated with the block. The reduced array C' defines starting locations within the B array for every $s^{th}$ term in A or equivalently every term in A'. Additional header information 66 is stored with each block of size s in the B array indicating for each character in the alphabet, how many times it occurred in the block. If any character did not occur at all in the block, then an additional value can be stored indicating the block number for the next occurrence of the character.

Figure 8:
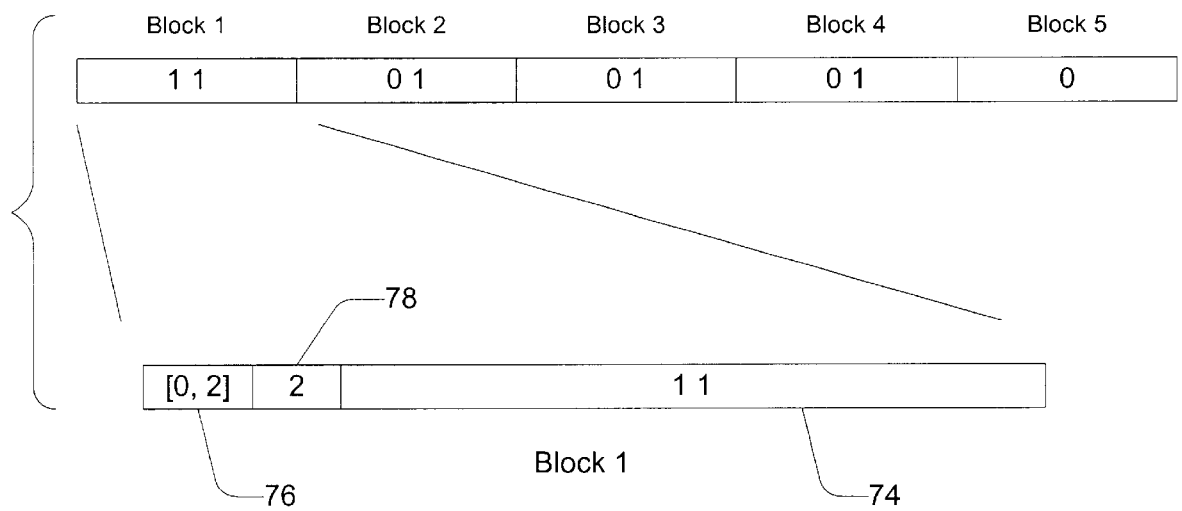
FIG. 8 shows a specific example of the FIG. 7 data structure.

For a target data pattern, the resultant data structure can be examined quickly at the block level and then in more detail within the block. FIG. 8 shows a data structure constructed for the nine character binary text of FIG. 6. For a block size s of 2, each block contains a two-character substring derived from the B array, as represented by the substring 74 containing characters "1 1." Suppose a search called for locating the fourth "0" in the B array without using the C' array. From a conceptual standpoint, the search skips the first block, which has two ones. The second block is examined and found to contain one zero, so the search proceeds to the third block. This process continues until the fifth block is reached. Within the fifth block, the substring is scanned to locate the zero, which is the fourth zero in B array. The C' array can be used to begin the search at various points in the B array which correspond to one of the characters in the A' array.

This same search using the C' array is represented visually in FIG. 6 by locating the third zero at the seventh row of array B (which is identified by the C' array) and scan downward until the next zero (i.e., fourth zero) is reached in the ninth row. This example shows how using the C' array speeds the search by making it unnecessary to start scanning at the very beginning of the B array. Each character in a desired pattern is found using this locate-and-scan technique facilitated by the C' array. The C' array can therefore be used as a shortcut to the full C array to recover any entire row of the matrix M of sorted rotations. The sorted rows of text can then be used as a conventional sorted index to find desired patterns in the text.

Using the reduced array C', the target block of the segmented B array can be located to within s occurrences of the character being searched. The particular block which includes the correct one of the s occurrences can then be located by examining at most s block headers. Finally, the particular occurrence is found by examining the characters within the correct block. The entire search requires Order(s) memory references to find a character which corresponds to a given character in the original A array.

A more detailed discussion of how a particular entry in the C array, and hence B array, is located using the blocks will now be described. Define an array t as follows:

$$t[i]=i-A'[A[i]].$$

Recall, the array A' defines the start locations of each unique character string in the ordered array A. For the FIG. 6 string of binary characters, the array A' is the locations of the first "0" and "1" characters in array A, or A'=[1,5]. For any row i of the matrix M starting with character A[i], the value t[i] indicates how many identical characters there are above the indexed $i^{th}$ character in array A. In other words, the value t[i] indicates how the process knows which zero is the fourth zero, because the fourth zero has three zeros above it in array A.

Now, the array element C[i] can be interpreted as the location of the $(1+t[i])^{th}$ character identical to A[i] in array B. Thus, if element C[i] is known, a subsequent element C[i+k] can be calculated by searching in array B beginning at element C[i]+1 for the $k^{th}$ occurrence of character A[i]. In other words, once the character at C[i] is found within a particular block, the desired character located at C[i+1], C[i+2], . . . C[i+k] can be found by scanning to the $k^{th}$ occurrence of character A[i].

As a result, if typical performance is all that matters, the reduced correspondence array C' together with array B (which consists of the whole text) and the reduced array A' is all that is needed to represent the matrix of rotations. A data structure containing the B array and the reduced arrays A' and C' requires less storage space as compared to storing the full size arrays A, B, and C. For large texts, the reduced arrays A' and C' are significantly smaller in comparison to their full size arrays A and C. The array A' is a fixed size dependent on the alphabet size, and by setting a large s value, the correspondence array C can be compressed to a size much smaller than that of the original text. Moreover, the structure now permits entry into individual portion of the text, by indexing the substrings in a block wise manner.

Type Headers (Step 48)

To facilitate an ability to scan for certain characters at a block level, the pattern matching application directs the computer to create a type header for each block (step 48 in FIG. 4). The type header contains a listing of all character types within the block, and the number of characters for each type in the block. The type header is stored at the start of the corresponding block, as indicated by the reference number 66 in FIG. 7. In FIG. 8, the type header 76 for the first block contains the information [0, 2], which means that the substring 64 in the block has no "0"s and two "1"s.

During a search for a particular pattern, the search tool can examine the type header to determine if the corresponding block contains any characters of interest, and if so, the number of such characters. Suppose, for example, a search is conducted for the fourth "0" in the B array. When the first block is examined, the type header 76 indicates that there are no zeros in block 1. The search is immediately continued to block 2, without accessing and scanning the character substring of block 1. At block 2, the type header indicates that the block contains one zero. The pattern matching application sets a zero count to one. At block 3, the type header indicates that the block contains one zero, causing the zero count to increment to two. This process is continued until the fifth block is reached. The type header indicates that block 5 contains one zero, which constitutes the fourth zero counted. At the fifth block, the pattern matching application scans the substring to locate the specific fourth zero.

For this simple example using a small text string, the savings in search time due to the type headers may seen trivial. For a large string of text having many characters (e.g., 256) within each block, the type headers are very useful. Suppose the search request is to locate the 10,000$^{th}$ zero. The type headers facilitate a very useful and efficient examine-and-skip protocol which rapidly bypasses blocks that have no potential of containing the requested zero. When the block containing the 10,000$^{th}$ zero is located, the substring is scanned until the exact zero is found (which will take no more that s steps).

Block Headers (Step 50)

One difficulty that may arise for large texts is that the target character may be very remote within the data structure. For instance, suppose that a particular character does not occur for 1000 blocks of the B array. In this case, even if s=2, we might know from the C' array that the 10$^{th}$ occurrence is in a particular block, but we would have to scan 1000 blocks looking for the 11$^{th}$ occurrence. Examining each block, one type header at a time, and counting the occurrences may take a long time.

To alleviate this problem and further improve search efficiency, the pattern matching application also directs the computer to create a jump header for each block (step 50 in FIG. 4). The jump header contains information of where the next character of a particular type might be found. As shown in FIG. 7, the jump header 68 is attached to the front of the block 62. The jump header 68 accounts for all character types that are not contained in the substring 62 and provides an indication in the form of a pointer or block address of where the next character of the absent type might be located.

As shown in the example of FIG. 8, a "0" character type is absent from the substring of block 1. The next "0" character is located in block 2. A jump header 78 contains a reference "2" indicating that the next character of type "0" is located in block 2.

The data structure shown in FIGS. 7 and 8 represent one possible implementation in which the type and jump headers are attached to the front of the blocks and stored in this manner. To find the $j^{th}$ character of a particular type, the search using the data structure of FIGS. 7 and 8 essentially entails examining the type headers of each block and adding the counts for the type of character. The jump headers are used to skip large groups of blocks that do not contain the character type. When the sum of the counts for the type of character is greater than j, the last block is scanned to find the exact location of the $j^{th}$ character. Since blocks without the character type can be skipped, the search requires at most j examinations of the starts of each block and s steps to scan through the last block. Thus the element C[i] can be evaluated in Order(s) steps as desired.

Compress Data Structure (Step 54)

At step 54 of FIG. 4, the pattern matching application directs the computer to compress the data structure. In particular, the substrings within each of the B array blocks is compressed independently of the other blocks. By compressing the blocks individually and independently, individual blocks identified in a search can be decompressed without decompression of all blocks. Additionally, compressing the B array speeds up access to the sorted rotations because less data needs to be scanned to find particular entries in the array.

In one implementation, the B array substring in each block is compressed using a combination of two well known compression techniques: move-to-front (MTF) encoding and run length encoding (RLE). For MTF encoding, a code book lists each character once and assigns a rank to each character. Every time a character is used, that character is moved to the front of the code book, and given the smallest rank. Frequently used characters tend to have smaller ranks. For RLE encoding, the number of repeated occurrences of the same character are stored so that long runs of the same character are highly compressed.

The compressed substring is then encoded using a variable length encoding, such as a code created by the Huffman algorithm, which his also well known. Variable length encoding uses fewer bits to encode the most frequently used indices and run-length.

In addition to compression, there may be some advantage to reconditioning the data in a format that is helpful for compression. When encoding compressible English text using this scheme, for example, it is possible to greatly reduce the memory overhead by converting each character in the alphabet to multiple characters in a smaller alphabet. An example implementation converted the English alphabet to an octal-based system. Each letter is represented by two consecutive three bit characters, thereby providing a character set of size 64. Characters in the original text which are not one of the 63 most common characters are represented by a 3 bit escape character followed by three additional 3 bit characters. Each index produced by the move-to-front encoder is a value between 1 and 7, inclusive. (The zero value is not needed because sequences of repeated characters are represented by a run-length rather than as zero indices from the move-to-front encoder). There are many choices for the mapping of 64 English characters (including the escape character) to two consecutive 3 bit symbols. As one example, a search algorithm can be used which finds a mapping to minimize the number of runs in the resulting run-length encoding. Data format manipulation techniques, such as this one, improve the compression rate.

The data structure and methods described above are advantageous over the prior art. One advantage is the reduction of memory overhead for storing the index terms. The data structure contains the B array (which is the same size as the original text) and the A' and C' arrays, and header information for the B array, which are all comparatively small. The C' array and header information have a size equal to the number of characters n divided by the block size s. The A' array has a size equal to the alphabet.

Another advantage is that the C' array and header information for the blocks of the B array all scale according to 1/s, and the A' array is a fixed size dependent on the alphabet size. As a result, there is a tradeoff (which varies with the block size s) between access speed and memory overhead. This is a highly desirable attribute. If a designer is more concerned with access speed, the designer uses a small block size s, which improves performance because the indexing array C' and header information are larger and contain more information to help facilitate the search. However, there is a cost of increased storage requirements.

On the other hand, if the designer is more interested in conserving storage space, the designer uses a larger block size s. The array C' and header information are smaller which improves storage efficiency, but at a cost of slower access time.

Another advantage is that the particular patterns or characters can be accessed in the data structure without decompressing the entire structure. By compressing the B array, block-by-block, a search of the data structure can access a particular block, decompress that block only without decompressing the others, and find a character within the target pattern. This aspect further improves search time efficiency.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method comprising the following steps:

producing a matrix of sorted rotations of a data string of characters, the matrix defining an A array comprising a sorted listing of the characters in the data string and a B array which is a permutation of the data string and a C array which contains entries of correspondence information linking the characters in the A array to the same characters in the B array;

segmenting the B array into blocks;

defining indexing information used to find particular characters within the blocks to reconstruct patterns of characters within the data string;

storing the blocks of the B array and the indexing information in a data structure; and finding patterns of characters within the data string using the data structure.

2. A method as recited in claim 1, further comprising the step of compressing the blocks of the B array individually of each other.

3. A method as recited in claim 1, wherein the defining step comprises the following steps:

examining each block of the B array; and for each associated block, constructing character type information that identifies which types of characters and how many characters of particular types are contained within the associated block.

4. A method as recited in claim 3, further comprising the step of organizing the data structure to include the blocks of the B array and a header associated with each block which contains the character type information.

5. A method comprising the following steps:
producing a matrix of sorted rotations of the data string, the matrix defining a B array which is a permutation of the data string;
segmenting the B array into blocks;
defining indexing information used to find particular characters within the blocks to reconstruct patterns of characters within the data string;
storing the blocks of the B array and the indexing information in a data structure;
examining each block of the B array;
for each associated block, constructing character type information that identifies which types of characters and how many characters of particular types are contained within the associated block;
organizing the data structure to include the blocks of the B array and a separate array containing the character type information for correlated blocks; and
finding patterns of characters within the data string using the data structure.

6. A method as recited in claim 1, wherein the defining step comprises the following steps:
examining each block of the B array; and
for each block, constructing character jump information to reference where a next character of a particular type occurs in the blocks of the B array.

7. A method as recited in claim 6, further comprising the step of organizing the data structure to include the blocks of the B array and a header associated with each block which contains the character jump information.

8. A method comprising the following steps:
producing a matrix of sorted rotations of the data string, the matrix defining a B array which is a permutation of the data string;
segmenting the B array into blocks;
defining indexing information used to find particular characters within the blocks to reconstruct patterns of characters within the data string;
storing the blocks of the B array and the indexing information in a data structure;
examining each block of the B array;
for each block, constructing character jump information to reference where a next character of a particular type occurs in the blocks of the B array;
organizing the data structure to include the blocks of the B array and a separate array containing the character jump information for correlated blocks; and
finding patterns of characters within the data string using the data structure.

9. A storage medium storing a data structure constructed according to the steps in the method as recited in claim 1.

10. A computer programmed to perform the steps of the method as recited in claim 1.

11. A computer-readable memory which directs a computer to perform the steps of the method as recited in claim 1.

12. A method comprising the following steps:
producing a matrix of sorted rotations of the data string, the matrix defining an A array comprising a sorted listing of the characters in the data string and a B array which is a permutation of the data string;
computing a correspondence array C which contains correspondence entries linking the characters in the A array to the same characters in the B array;
computing a reduced A' array which identifies each unique character in the A array;
computing a reduced C' array which contains every $s^{th}$ entry of the C array;
segmenting the B array into blocks of size s;
storing the blocks of the B array, the A' array, and the C' array in a data structure; and
finding patterns of characters within the data string using the data structure.

13. A method as recited in claim 12, further comprising the step of compressing the blocks of the B array individually of each other.

14. A method as recited in claim 12, further comprising the following steps:
examining each block of the B array; and
for each associated block, constructing character type information that identifies which types of characters and how many characters of particular types are contained within the associated block.

15. A method as recited in claim 14, further comprising the step of storing in the data structure the character type information as a header to the associated block of the B array.

16. A method as recited in claim 14, further comprising the step of storing in the data structure the character type information as a separate array.

17. A method as recited in claim 12, wherein the defining step comprises the following steps:
examining each block of the B array; and
for each associated block, constructing character jump information to reference where a next character of a particular type occurs in the blocks of the B array.

18. A method as recited in claim 17, further comprising the step of storing in the data structure the character jump information as a header to the associated block of the B array.

19. A method as recited in claim 17, further comprising the step of storing in the data structure the character jump information as a separate array.

20. A method as recited in claim 17, wherein the data string comprises DNA sequences.

21. A storage medium storing a data structure constructed according to the steps in the method as recited in claim 12.

22. A computer programmed to perform the steps of the method as recited in claim 12.

23. A computer-readable memory which directs a computer to perform the steps of the method as recited in claim 12.

24. A computer-readable memory having a data structure, the data structure being derived from a matrix of sorted rotations formed from a data string of characters, the matrix defining an A array comprising a sorted listing of the characters in the data string and a B array which is a permutation of the data string and a C array which contains entries of correspondence information linking the characters in the A array to the same characters in the B array, the data structure comprising:
multiple blocks having substrings of characters segmented from the B array; and
at least one index array used to index the blocks.

25. A computer-readable memory as recited in claim 24, wherein the substrings of each block are compressed.

26. A computer-readable memory as recited in claim 24, further comprising a type header attached to each block, the type header identifying which types of characters and how many characters of particular types are contained within the associated substring.

27. A computer-readable memory as recited in claim 24, further comprising a jump attached to each block, the jump header referencing where a next character of a particular type occurs in the blocks of characters.

28. A computer-readable memory having a data structure, the data structure being derived from a matrix of sorted rotations formed from a data string of characters, the matrix defining an A array comprising a sorted listing of the characters in the data string and a B array which is a permutation of the data string and a C array which contains entries of correspondence information linking the characters in the A array to the same characters in the B array, the data structure comprising:

multiple blocks having substrings of s characters segmented from the B array;

an A' array which identifies each unique character in the A array;

a C' array which contains every $s^{th}$ entry of the C array; and the A' and C' arrays being used to reconstruct the data string of characters from the multiple blocks when searching for a particular pattern of characters within the data string.

29. A computer-readable memory as recited in claim 28, wherein the substrings of each block are compressed.

30. A computer-readable memory as recited in claim 28, wherein the data structure further comprises an array containing character type information that identifies which types of characters and how many characters of particular types are contained within the associated block.

31. A computer-readable memory as recited in claim 28, wherein the data structure further comprises an array containing character jump information which references where a next character of a particular type occurs in the blocks.

32. A computer system comprising:

a processor;

an application executable on the processor to produce a matrix of sorted rotations of a data string of characters, the matrix defining an A array comprising a sorted listing of the characters in the data string and a B array which is a permutation of the data string and a C array which contains entries of correspondence information linking the characters in the A array to the same characters in the B array, the application further directing the processor to segment the B array into blocks and to define indexing information used to find particular characters within the blocks to reconstruct patterns of characters within the data string;

a memory to store a data structure containing the blocks of the B array and the indexing information; and the processor finding patterns of characters within the data string using the data structure.

33. A computer system as recited in claim 32, wherein the application further directs the processor to compress the blocks of the B array independently of each other.

34. A computer system as recited in claim 32, wherein the application further directs the processor to derive character type information for each block that identifies which types of characters and how many characters of particular types are contained within the associated block.

35. A computer system as recited in claim 32, wherein the application further directs the processor to derive character jump information for each block that references where a next character of a particular type occurs in the blocks.

* * * * *

UNITED STATES PATENT AND TRADEMARK OFFICE
CERTIFICATE OF CORRECTION

PATENT NO. : 6,119,120
DATED : September 12, 2000
INVENTOR(S) : John W. Miller

Page 1 of 1

It is certified that error appears in the above-identified patent and that said Letters Patent is hereby corrected as shown below:

Column 6,
Line 29, add -- the -- after "for"

Column 7,
Lines 49 and 66, change "fall" to -- full --.

Signed and Sealed this

Thirtieth Day of July, 2002

Attest:

Attesting Officer

JAMES E. ROGAN
Director of the United States Patent and Trademark Office